US007654710B2

(12) United States Patent
Williams et al.

(10) Patent No.: US 7,654,710 B2
(45) Date of Patent: Feb. 2, 2010

(54) RETRACTABLE RECESSED EMERGENCY LUMINAIRE

(75) Inventors: Thomas J. Williams, Philadelphia, PA (US); Robert A. Flieder, Hamilton, NJ (US); Adrian V. Pavitt, Newtown, PA (US)

(73) Assignee: Evenlite, Inc., Bensalem, PA (US)

( * ) Notice: Subject to any disclaimer, the term of this patent is extended or adjusted under 35 U.S.C. 154(b) by 160 days.

(21) Appl. No.: 11/441,963

(22) Filed: May 26, 2006

(65) Prior Publication Data

US 2007/0274083 A1 Nov. 29, 2007

(51) Int. Cl.
*B60Q 1/06* (2006.01)

(52) U.S. Cl. ........................ 362/386; 362/384; 362/147

(58) Field of Classification Search ................. 362/386, 362/364, 147

See application file for complete search history.

(56) References Cited

U.S. PATENT DOCUMENTS

| | | | | |
|---|---|---|---|---|
| 4,651,258 | A | 3/1987 | Davis et al. | 362/147 |
| 4,708,223 | A | 11/1987 | Orndorff et al. | 362/459 |
| 4,802,065 | A | 1/1989 | Minter et al. | 362/20 |
| 5,025,349 | A | 6/1991 | Gow | 362/20 |
| 5,682,131 | A | 10/1997 | Gow | 340/286.11 |
| 5,851,061 | A | 12/1998 | Hegarty | 362/20 |
| 6,097,279 | A | 8/2000 | Gow | 340/286.11 |
| 6,164,788 | A * | 12/2000 | Gemmell et al. | 362/20 |
| 6,371,621 | B1 | 4/2002 | Le Bel | 362/20 |
| 6,763,624 | B2 | 7/2004 | Gow | 40/560 |

OTHER PUBLICATIONS

Brochure of Evenlite Eclipse © 2006.
Specification sheet for Retract-Lite, manufactured by Emergi-Lite.
Mirrorlite Emergency Lighting, MIR Series, manufactured by Evenlite.
Mirrorlite Recessed Emergency Light, MIR-SD, manufactured by Evenlite.
Coverlite, manufactured by Signtex.
Velare, sold by Lithonia, manufactured by Evenlite © 2005.
Genie, sold by Isolite, manufactured by Evenlite.
Fantum, advertised by McPhilben.

(Continued)

*Primary Examiner*—Sandra L O'Shea
*Assistant Examiner*—Evan Dzierzynski
(74) *Attorney, Agent, or Firm*—Mark A. Garzia, Esq.; Law Offices of Mark A. Garzia, P.C.

(57) ABSTRACT

The present invention is an improved emergency luminaire, which is recess-mounted flush within a wall or ceiling aperture, having an enclosure, a panel, a light source, a means for rotating the panel from the closed position to the open position and a means for rotating the panel from the open position to the closed position. The means for rotating the panel from the closed position to the open position includes a single-directional motor. Upon electrical power failure to the primary lighting source in the room, the single-directional drive motor is activated causing the panel to rotate 180 degrees from a closed position to an open position, thereby exposing the light source to view. Substantially simultaneously with the panel opening, power stored in batteries are connected to the light source, causing it to illuminate. When the primary electrical power is restored, the light source is extinguished and the single-directional drive motor is activated returning the panel to its closed position.

14 Claims, 7 Drawing Sheets

OTHER PUBLICATIONS

1000 Series, manufactured by Concealite © 2005.
Conceal-Alarm, manufactured by Concealite © 2003.
Secure-Alarm, manufactured by Concealite © 2003.
5000 Series, manufactured by Concealite © 2003.
The Chameleon, manufactured by Concealite © 2003.
Hydro-Lite, manufactured by Concealite © 2003.
Hydro-Lite II, manufactured by Concealite © 2003.

* cited by examiner

RETRACTABLE RECESSED EMERGENCY LUMINAIRE

FIELD OF THE INVENTION

This invention relates generally to an emergency luminaire and, more specifically, to a recess-mounted emergency luminaire which employs a motor that rotates in one direction.

BACKGROUND OF THE INVENTION

Emergency lighting systems are required by national life safety codes (and various national and local government codes) in virtually every building and office where the general public may visit or congregate. As such, emergency lighting systems are well-known in the art.

An emergency lighting fixture usually includes one or more light sources or lamps, an AC (alternating current) failure detection circuit, a battery to provide power when the AC power has been interrupted, and a trickle charger to keep the battery fully charged. Other features may be found on a specific emergency light fixture, but the primary function of the emergency light is to illuminate a path of egress from a building upon loss of power from the primary electrical supply system.

Many emergency lighting systems, with their associated battery packs, are surface mounted against a wall or ceiling. The lamps are pre-adjusted or aimed in a position and location so that the beam of light illuminates a path of egress.

In operation, the emergency light fixture is connected to an AC power supply. The AC current supplies power to a battery charger to ensure that the battery is always charged to its optimum level. When the AC current to the emergency lighting fixture has been interrupted (and presumably interrupted to the room or building where the lighting fixture is located), the AC detection circuit senses the interruption and immediately forms an electrical connection between the battery and the lamps, thereby activating the lamps. The AC detection circuit may be as simple as a solenoid switch that is held open by the AC power, and when AC power is lost, the solenoid switch closes, thereby forming the connection between the battery and lamps.

Surface mounted emergency lights are normally considered unattractive and detract from contemporary design and architecture. Also, surface mounted emergency lights are more susceptible to tampering and mischief (e.g., kids breaking the lights for “fun”). Because of this, recent attempts have been made to conceal the luminaire into a wall or ceiling, allowing it to be substantially hidden from view (and protected) under normal conditions when power is available, yet to allow the light source to become exposed in a position to illuminate the path of egress upon loss of electrical power.

Examples of prior concealed emergency light fixtures are disclosed in U.S. Pat. Nos. 4,802,065 to Minter et al.; 5,025,349 to Gow; 5,682,131 to Gow; 5,851,061 to Hegarty; 6,097,279 to Gow; 6,164,788 to Gemmell et al.; and 6,371,621 to Le Bel. These prior systems include significant deficiencies in performance, reliability and cost, thereby limiting their use.

U.S. Pat. No. 4,802,065 (Minter et al.) discloses an emergency light fixture that can only be mounted in a ceiling as it requires the force of gravity on the panels to open. Many public buildings which require emergency lights have high ceilings where mounting in a wall is preferred. Accordingly, Minter may not be a feasible option since wall-mounting would prevent the force of gravity from assisting in the opening of the panels.

U.S. Pat. No. 5,025,349 (Gow) discloses an emergency lighting fixture that must be mounted in a ceiling to provide a useable light pattern. In addition, Gow teaches the use of a bi-directional motor which has a higher probability of mechanical jams upon the failure of a limit switch. Moreover, bi-directional motors require relatively more complex reversing circuitry, which adds to the cost of the emergency lighting system.

U.S. Pat. No. 5,682,131 (Gow) discloses a retractable annunciator that utilizes a bi-directional motor and its associated reversing circuitry to operate.

U.S. Pat. No. 5,851,061 (Hegarty) discloses a recessed emergency lighting fixture in which the light source remains inside the enclosure of the fixture and an external mirror controls the light beam. The light source/mirror arrangement requires additional ventilation. The additional ventilation requirement may increase the relative cost of the Hegarty fixture, and may make the fixture unfeasible for certain locations. Also, the position of the light source limits the ability to adjust the direction of the light beam.

U.S. Pat. No. 6,097,279 (Gow) discloses a retractable annunciator that requires a bi-directional motor and its associated reversing circuitry to operate.

U.S. Pat. No. 6,164,788 (Gemmell et al.) teaches a concealed, drop-down emergency light unit that operates under the force of gravity to open a pivotally-mounted door. Accordingly, a wall mount is generally not feasible for a Gemmell light unit. Further, the door does not rotate a full 180 degrees, thereby restricting the adjustment options of the lamps. Even further, Gemmell implements a drive system employing multiple gears and a clutch mechanism that increases the cost and complexity of the light unit.

U.S. Pat. No. 6,371,621 (Le Bel) discloses a servo-controlled emergency lighting fixture that uses a relatively complex hinge arrangement that must both pivot and translate the cover relative to the housing. Le Bel also teaches the use of a pulse proportional servo-motor. Pulse proportional servo-motors are undesirable due to their cost and their susceptibility to mechanical jams should a limit switch fail. In addition, Le Bel’s drop-down cover requires gravity assistance making wall placement of the lighting fixture unfeasible.

SUMMARY OF THE INVENTION

In order to provide a wide variety of applications, high reliability and economy of construction, it is desirable to employ an emergency luminaire that does not depend on the force of gravity to operate the system. It is also desirable to use a single-directional drive motor instead of either a bi-directional motor or a pulse proportional servo-motor, where the failure of a limit switch may result in a mechanical jam and malfunction. Single-directional motors are also preferred because they do not require complex and costly reversing circuitry as required by the bi-directional motors, nor do they require pulse-drive circuitry as found in fixtures using pulse proportional servo-motors. In addition, upon activation, it is desirable to locate/move the light source completely outside of the wall or ceiling surface; this location provides maximum adjustment capabilities for the light beam, as well as maximum ventilation.

The emergency luminaire system disclosed herein includes a recessed housing or enclosure, a light source, a rotatable panel, a one-direction motor, a battery, a battery charger, an AC power failure detection circuit and a drive system that works with the one-direction motor. Since virtually every emergency lighting system employs a battery, a battery charger, and an AC power failure detection circuit (all of which are well-known in the art), they will not be discussed in detail herein.

The system herein has its light source mounted on one side of a rotatable panel. The panel pivots 180 degrees around its center axis in a manner to either completely enclose the light source in the recessed housing when the primary power source is detected, or completely expose the light source when the primary power source is not detected and the lighting system is activated.

When the panel is closed, it is substantially flush to the surface of a wall or ceiling, and the light source is hidden from view behind the panel (i.e., within the housing). Upon electrical power failure, the battery provides power to the motor to rotate the panel substantially 180 degrees to an open position, thereby exposing the light source to view; the battery also provides power to the light source, causing it to illuminate.

The drive system is designed to convert the motor's rotation into a force that rotates the panel. The pivoting panel is connected to a drum at its axis. A drive band is secured to the drum and is wound around the drum for at least one turn. The drum and panel axis are both attached to a torsion spring. The drive band extends around a roller, and a crank arm; the drive band is terminated at a band adjustment arm. The crank arm is attached to the axle of the drive motor. The band adjustment arm is biased by a compression spring ensuring some tension on the drive band.

The torsion spring (which is mounted on the panel drum), acts to keep the panel closed against a mechanical stop, with the crank arm loosely engaging the drive band, ensuring that the light source is completely enclosed. Activation of the motor causes the crank arm to rotate thereby deflecting the drive band in a manner to pull from the portion wound around the drum, thereby rotating the panel. As the panel opens, the torsion spring is compressed.

Limit switches signal the motor shortly before the panel reaches its open or closed stops, allowing a dwell period to ensure that the panel is completely open or completely closed. A failure of either one or both of the limit switches allows the motor and the panel to continue their respective motions, but does not result in a mechanical jam.

The light source continues to illuminate until either the battery charge is depleted completely (or to a pre-set cut-off voltage), or the input power is restored. Once the primary power supply is re-established, the light source is extinguished and the drive motor is activated so that the crank arm rotates, relieving the tension on the drive band, allowing the torsion spring mounted to the drum to smoothly return the panel to its closed or "rest" position.

Other objects, advantages and novel features of the present invention will be apparent from the following detailed description of the invention.

BRIEF DESCRIPTION OF THE DRAWINGS

The accompanying drawings, which are incorporated in and form a part of the specification, illustrate an exemplary embodiment of the present invention and, together with the following description, serve to explain the principles of the invention. For the purpose of illustrating the invention, there are shown in the drawings embodiments which are presently preferred, it being understood, however, that the invention is not limited to the specific instrumentality or the precise arrangement of elements or process steps disclosed.

In the drawings.

DETAILED DESCRIPTION OF THE PREFERRED EMBODIMENT

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Preferred embodiments of the present invention will now be disclosed and described in detail with reference to the accompanying drawings in which an emergency luminaire in accordance with the present invention is generally indicated at 10.

The emergency luminaire 10 disclosed herein appears to the casual observer to operate in a similar manner to earlier recessed emergency light fixtures. Upon loss of power to the primary lighting source in a room, or "brown-out" condition, the AC failure detection circuit, backed up by the battery, activates the motor, causing a door or panel to rotate. The light source, typically attached to the back of the door, is exposed. Once the door reaches the fully open position and the light source is exposed, the battery, which was maintained in a state of full charge during the period when primary power was available, is connected to the light source, causing it to illuminate. However, how the subject emergency luminaire 10 accomplishes this task is unique.

Figure 1:
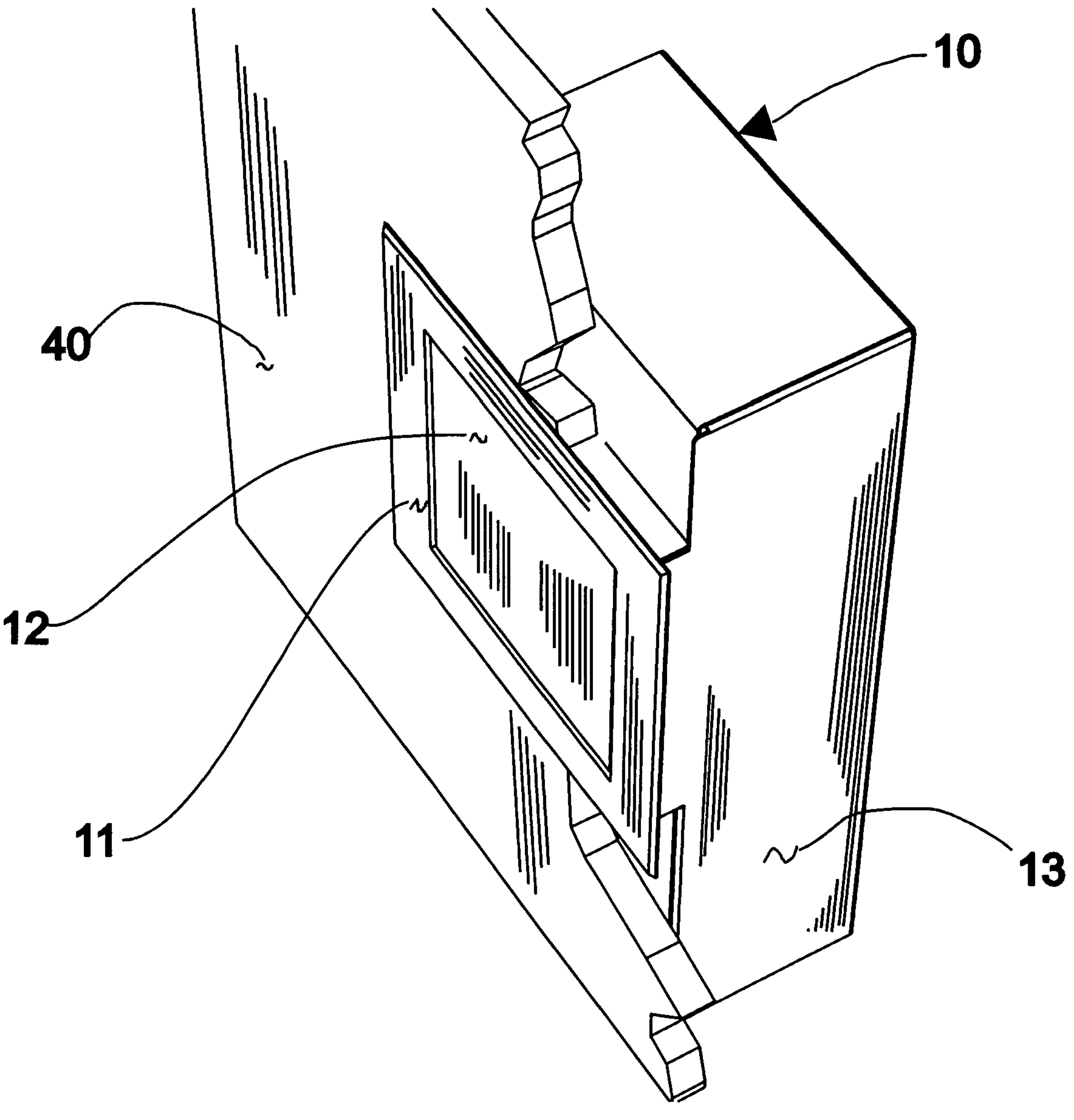
FIG. 1 is a fragmentary front perspective view of an emergency luminaire in accordance with the present invention shown mounted in a wall with the panel in a closed position.

Referring now to the drawings, and initially to FIG. 1, there is shown a luminaire frame 11, a rotatable panel 12 (shown in its closed position), and a "back box" enclosure 13 mounted in wall 40 or ceiling. As illustrated, the appearance of the present invention from the perspective of a person in the room is of a relatively flat, unobtrusive frame. The enclosure 13 (sometimes referred to as the "housing") is recessed within the wall or ceiling and is not visible to a person or persons in the room.

Figure 2:
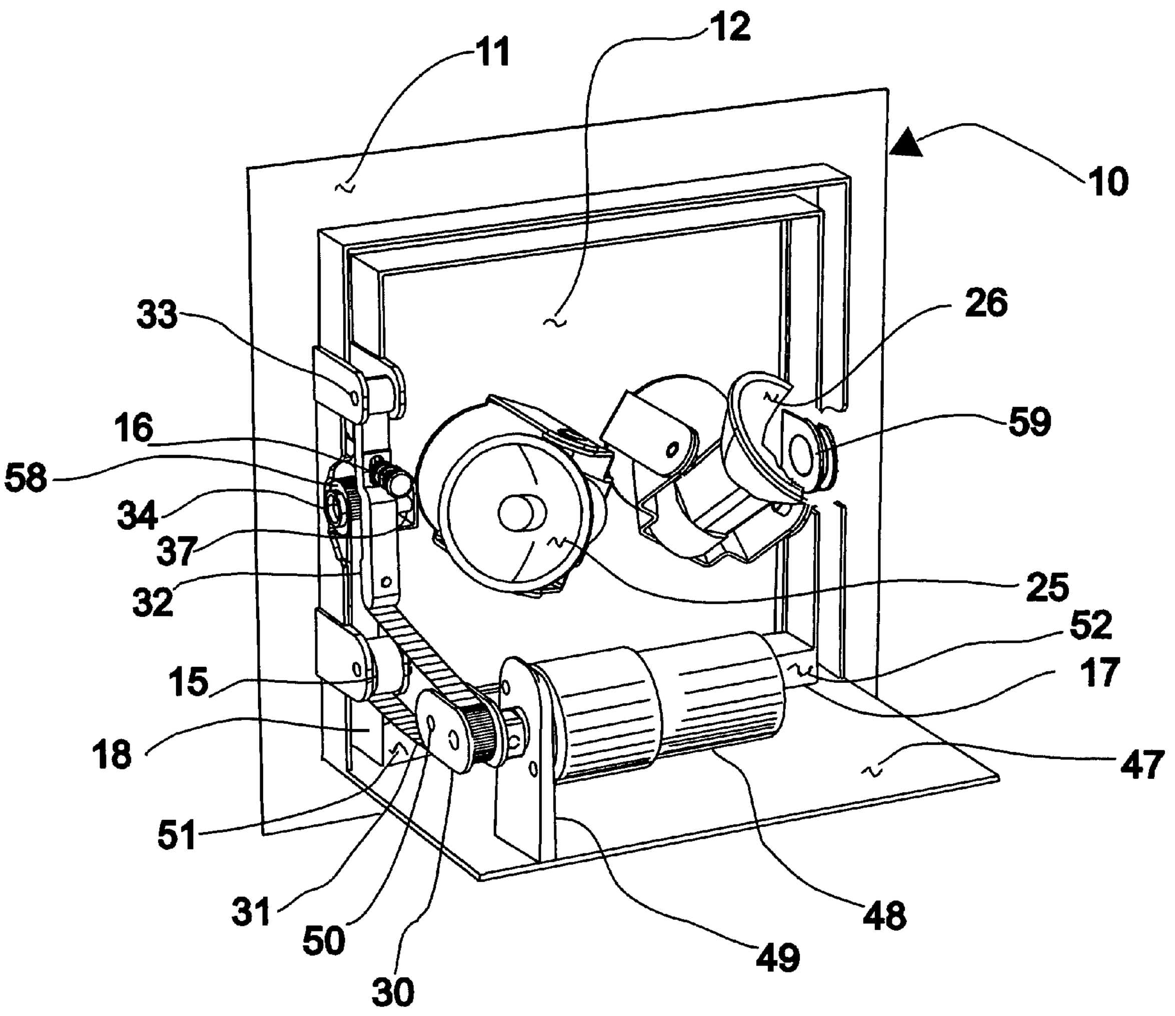
FIG. 2 is a rear perspective view of the emergency luminaire shown in FIG. 1 with the housing deleted in order to show the components.

FIG. 2 is a rear perspective view of the emergency luminaire 10 shown in FIG. 1 without the enclosure 13 so that the remaining components can be shown; also, lamp 26 is shown as a cut-away. Rear side of frame 11 abuts against the wall 40. Light sources 25 and 26 are mounted on the rear side of panel 12. Panel 12 is in the closed position, which is its "rest" position when the primary power supply (usually the AC current) is detected by the emergency luminaire 10.

FIG. 2 shows a preferred embodiment wherein two light sources 25 and 26 are swivel-mounted on rear side of panel 12 so that their illumination pattern is fully adjustable. The number of light sources mounted to the panel is not intended to be a limitation to the present invention as a plurality of light sources may be needed to provide adequate lighting for egress.

Motor mount 47 is rigidly fastened to the rear side of frame 11 in a location so that it, or components secured to it, will not interfere with the movement of panel 12. Bracket 49 is fastened at a right angle to motor mount 47, and drive motor 48 is secured to bracket 49. Crank arm 30 is attached to the shaft of motor 48.

An important feature of the present invention is a drive system that incorporates a motor 48 that is single-directional and an elongated, metal drive band 31. In other words, the motor and its shaft only rotate in one direction. Accordingly, reversing circuitry is not needed in the present invention. This feature will be more fully explained later in this disclosure.

Continuing to refer to FIG. 2, drive band 31 has a first end which is secured to band adjustment arm 32. Band 31 is preferably made of steel and is designed not to stretch. From adjustment arm 32, drive band 31 engages crank arm 30, partially wraps over roller 15, and terminates at drum 34. Second end of drive band 31 attaches to drum 34 and makes at least one revolution around drum 34. As crank arm 30 rotates, it depresses the drive band 31 gradually increasing the tension on drive band 31; when drive band 31 is depressed, it unwraps itself from drum 34, rotating drum 34 as it unwraps. As crank arm 30 continues to rotate, it decreases the tension on drive band 31 and the drive band 31 is rewound around drum 34.

When the primary power source is detected by the emergency luminaire 10, no power is supplied to the motor 48. Upon loss of power to the building or the room, the single-directional motor 48 is electrically connected to the battery 19, causing the shaft of the motor 48 to rotate. Crank arm 30 begins to rotate and deflects the drive band 31, which in turn causes the drive band 31 to unwrap from around drum 34; as the drive band 31 unwraps, it rotates drum 34. Panel 12 is connected to axis 58 and diametrically opposed axis 59; axis 58 is connected in turn to drum 34. A support on each side of the frame 11 allows axis 58 and opposing axis 59, respectively, to pass through thereby preventing all but rotational movement of the panel 12.

As drum 34 rotates, the panel's axis 58 rotates, thereby moving the panel 12 from its closed or "rest" position to the fully open position. Opposing axis 59 freely rotates within its support. The fully open position is shown in FIG. 3.

Circuitry to detect the interruption of AC power and then to activate emergency lights upon the loss of AC power is well-known in the art. In the present system, as in other recessed emergency luminaire systems that utilize motors, the battery 19 powers both the motor 48 and the emergency lights 25, 26 during the power interruption. When power is restored, the motor 48 rotates to its rest position relaxing tension on the drive band 31, the torsion spring 37 forces the panel 12 to rotate in the opposite direction from its open position to its closed position, and the battery 19 begins to re-charge.

Figure 3:
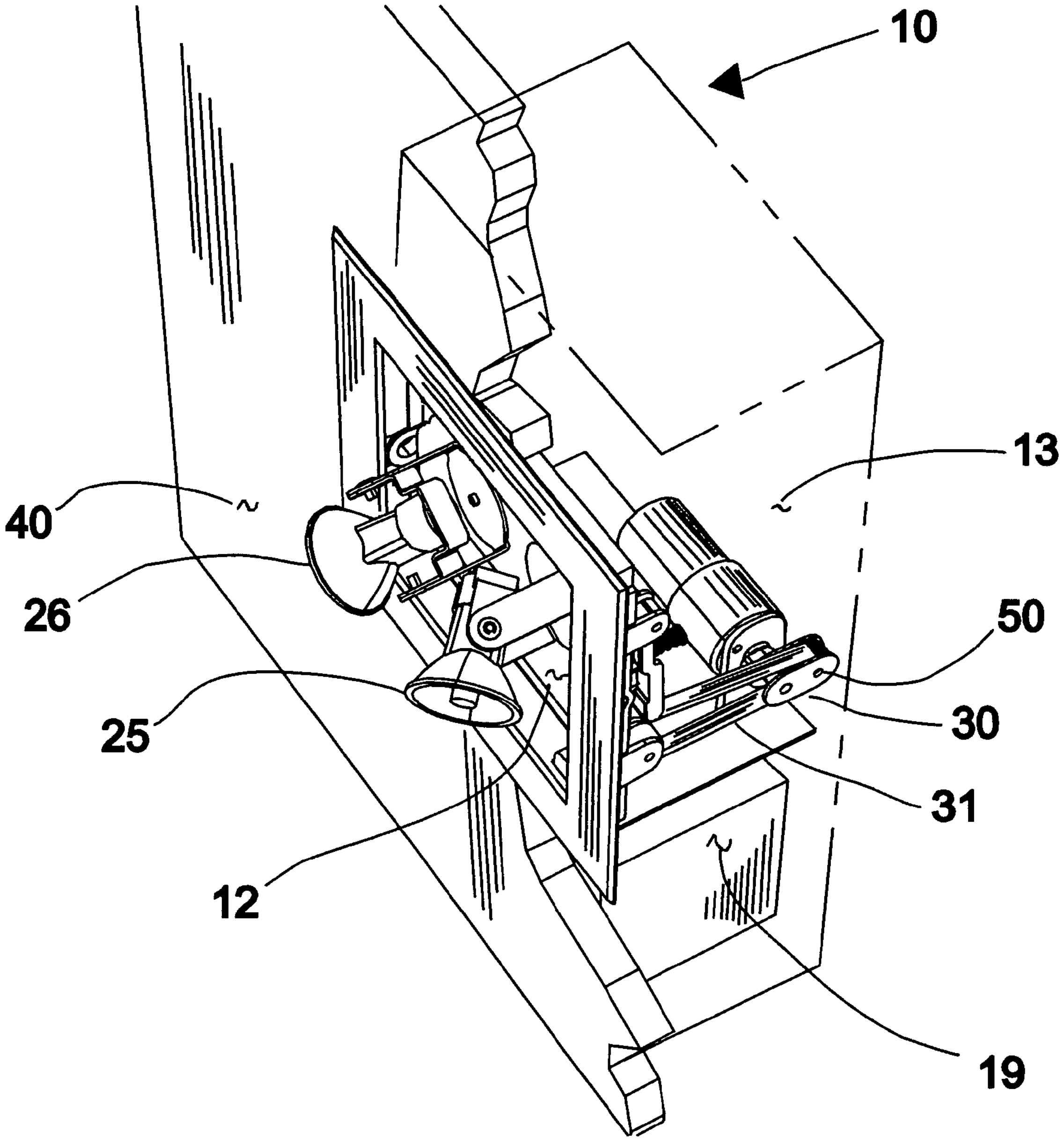
FIG. 3 is a fragmentary front perspective view of the emergency luminaire shown in FIG. 1 with the panel in the open position and the housing/enclosure shown in phantom.

The battery 19 may be mounted within the enclosure 13 as illustrated in FIG. 3 or it may be remotely located. In addition, the AC detection circuitry, although not shown, may be attached to the motor mount 47, or any other convenient spot inside (or even outside) the enclosure 13.

The operation of the emergency luminaire 10 upon an interruption in the primary electrical power supply will now be described more fully with reference to FIGS. 4 through 7.

FIGS. 4 through 7 are enlarged views of the drive system taken from the left side when viewed from FIG. 2.

Figure 4:
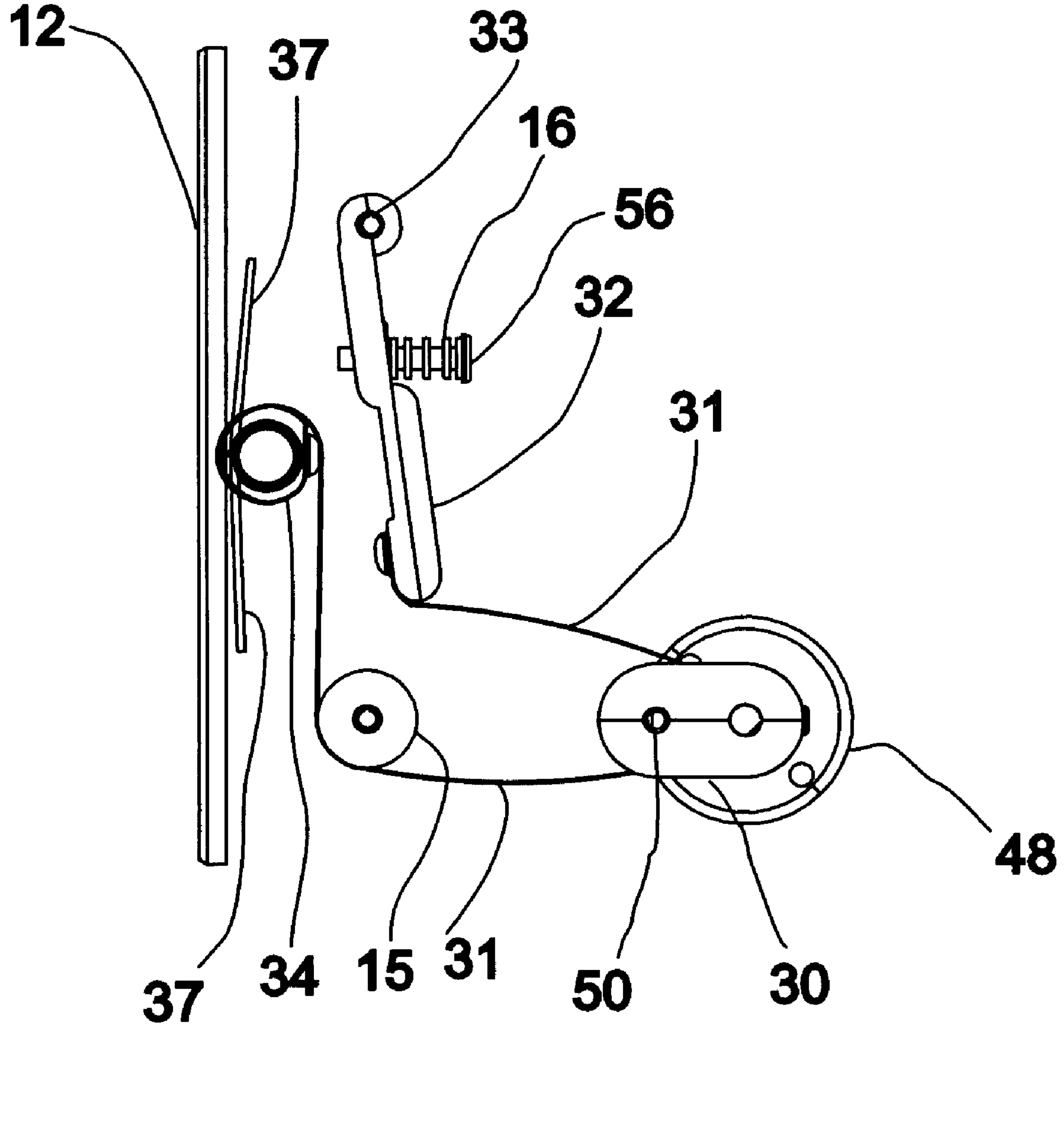
FIG. 4 is an enlarged view of the drive system of the emergency luminaire shown in FIG. 2 with the panel in the closed position.

When the primary power supply is available, the panel 12 is closed (as previously illustrated in FIG. 1) and the drive system is as illustrated in FIG. 4. When the panel 12 is in its fully closed position, it engages first limit switch 18 and physically abuts up against mechanical stop 51. Mechanical stop 51 prevents the panel 12 from overshooting its fully closed position and ensures that the front side facing the room makes as unobtrusive appearance as possible (i.e., when closed, the panel 12 is substantially in the same plane as the wall 40).

Drive band 31 has a first end which is secured to band adjustment arm 32. The second end of drive band 31 is wrapped at least once around drum 34 and secured thereto. In between its two ends, drive band 31 engages crank arm 30 and extends over roller 15.

Crank arm 30 must have an irregular shape in order to alternately increase tension then decrease tension on drive band 31. In a preferred embodiment, crank arm 30 has an oval-shape so that the tension on drive band 31 may be ramped up gradually then ramped down gradually. As the motor 48 rotates, crank arm 30 alternately increases its pull on drive band 31, then decreases its pull on drive band 31. In order to reduce friction as crank arm 30 engages and depresses drive band 31, in one embodiment crank arm 30 includes crank arm roller 50. As the motor 48 rotates, and the tension increases on drive band 31, crank arm roller 50 rotates reducing friction between the drive band 31 and the crank arm 30, preventing the drive band 31 from catching on the crank arm, and providing a smoother transition for rotating the panel 12.

Pin 33 connects the adjustment arm 32 to the frame 11 and allows the adjustment arm 32 to pivot. Compression spring 16 supplies a force to adjustment arm 32 to ensure that the drive band remains taut when the motor is turning and the panel 12 is rotating from its closed position to its open position. The tension supplied by compression spring 16 to the adjustment arm 32 may be adjusted by turning screw 56.

When the panel 12 is fully closed, the drive system is as illustrated in FIG. 4. Specifically, crank arm 30 is at a location that depresses that drive band 31 the least amount, and compression spring 16 applies minimal force on band adjustment arm 32 to create minimal tension on drive band 31.

Continuing to refer to FIG. 4, crank arm 30, attached to drive motor 48, provides minimum tension to drive band 31, so that torsion spring 37 ensures that panel 12 remains closed against the mechanical stop 51. Crank arm 30, drive band 31, and torsion spring 37 are considered to be in their "rest" position (panel 12 being in its fully closed position).

Mechanical stop 51 prevents panel 12 from over rotating past its "fully" closed position. Referring again to FIG. 2, in a preferred embodiment, mechanical stop 51 can be formed from the housing of the limit switch 18. Limit switch 18 would have its actuator facing towards the room and positioned to allow the side of panel 12 on which the lamps 25 and 26 are attached to engage the actuator of limit switch 18 when the panel approaches its fully closed position. When the panel engages the actuator, limit switch 18 disconnects the power from motor 48.

When the AC power detection circuit senses that AC power has been interrupted, motor 48 is engaged. Battery 19 is connected to the motor 48 causing the motor 48 and the crank arm 30 to rotate in the counter-clockwise direction as viewed in FIG. 5.

Figure 5:
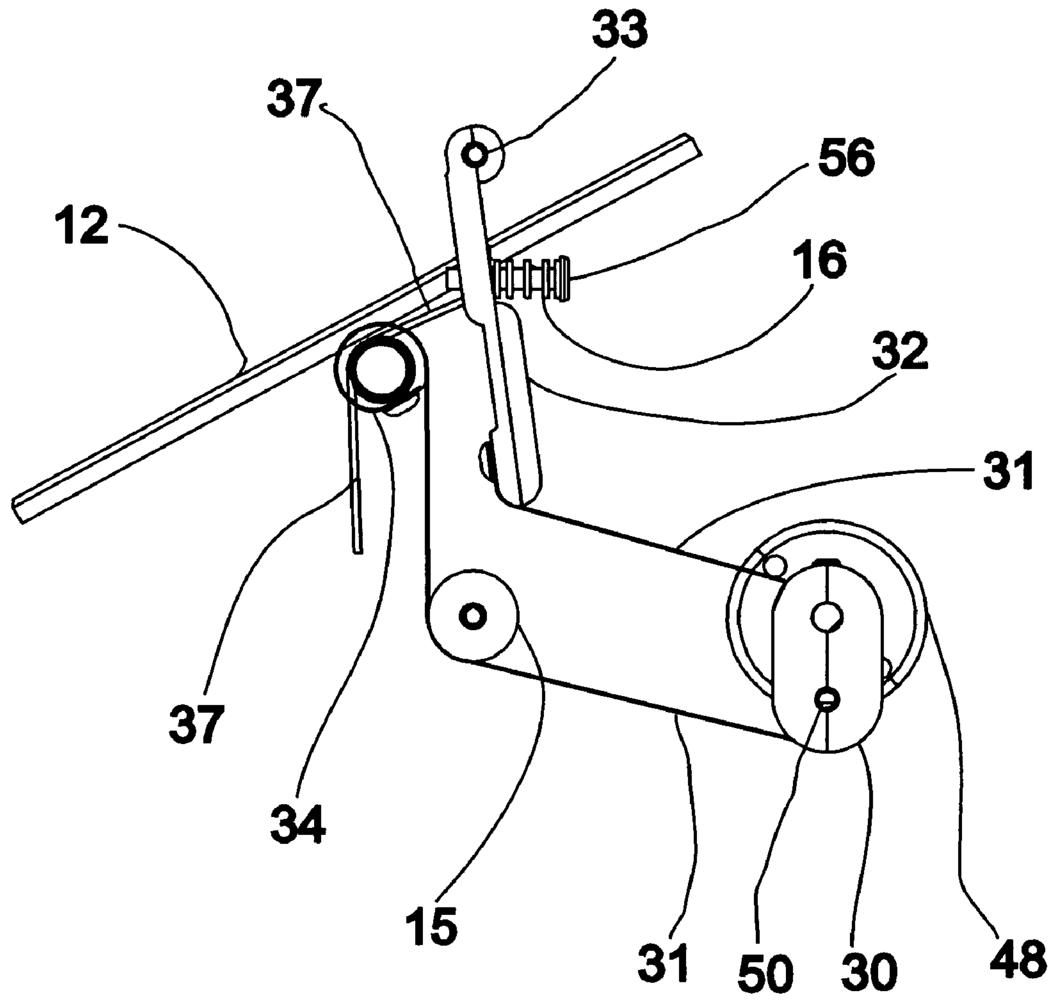
FIG. 5 is an enlarged view of the drive system of the emergency luminaire shown in FIG. 2 with the panel partially open having rotated in the clockwise direction.

Continuing to refer to FIG. 5, crank arm 30 has rotated counterclockwise approximately ninety degrees, thereby increasing tension to drive band 31, causing it to unwind panel drum 34, resulting in panel 12 rotating clockwise and opening approximately fifty degrees from its fully closed position.

As can be seen in FIG. 5, torsion spring 37 begins to compress. Motor 48 must provide enough force to drive band 31 to force the panel 12 against torsion spring 37. Adjustment arm 32 ensures that drive band 31 remains under continuous pressure which allows crank arm 30 to depress the drive band 31. Roller 15 rotates and generally guides the drive band as the force on the drive band increases and decreases.

Figure 6:
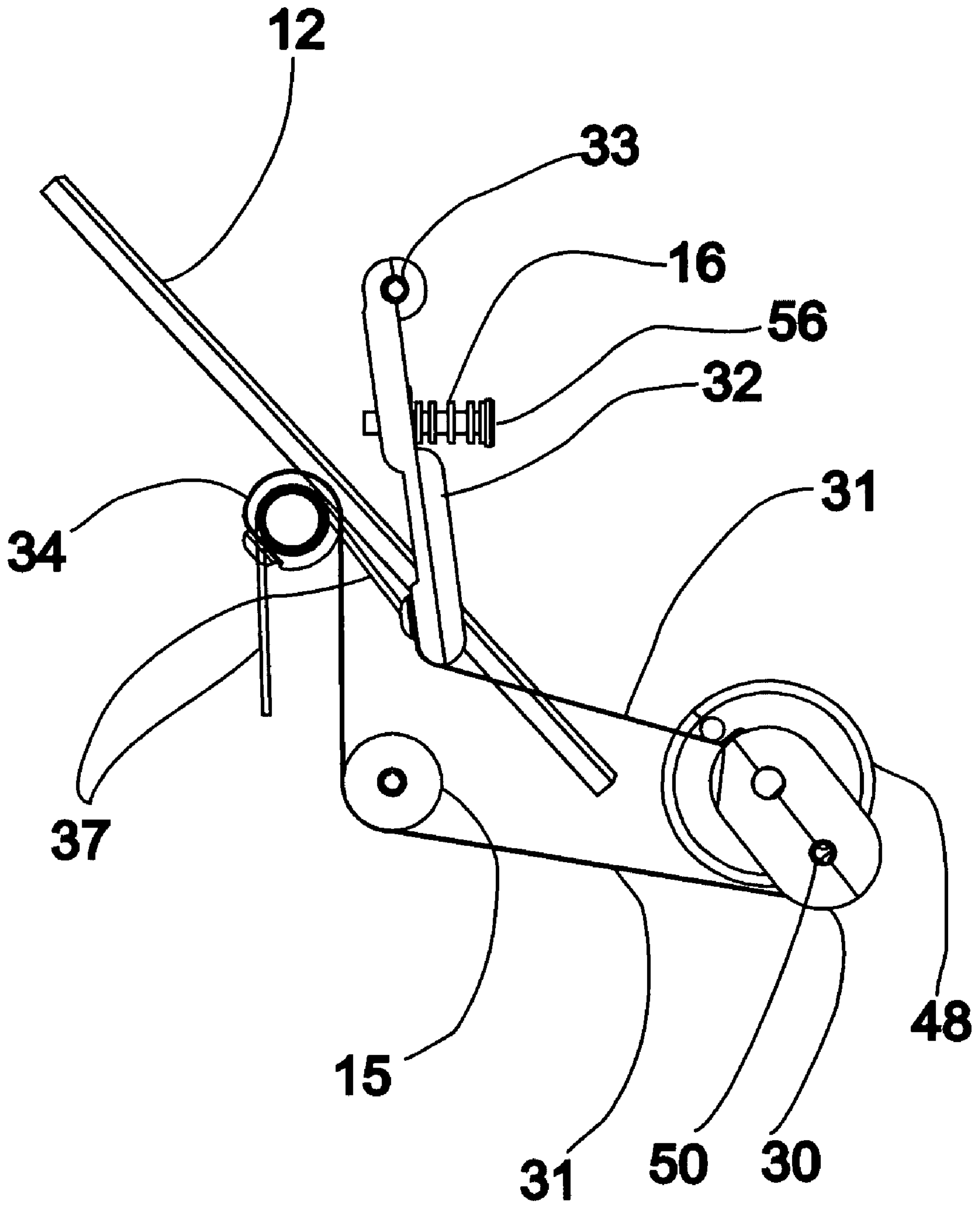
FIG. 6 is an enlarged view of the drive system of the emergency luminaire shown in FIG. 2 with the panel open even further than the position shown in FIG. 5.

As motor 48 continues to rotate, it applies increasing pressure to drive band 31. As illustrated in FIG. 6, crank arm 30 has rotated counterclockwise approximately 135 degrees from the closed or rest position. As the tension on drive band 31 increases, it causes panel drum 34 to unwind a further amount, resulting in panel 12 rotating clockwise a further amount (to an opening of approximately 135 degrees from the closed position). As can be seen in FIG. 6, torsion spring 37 is compressed even further.

Figure 7:
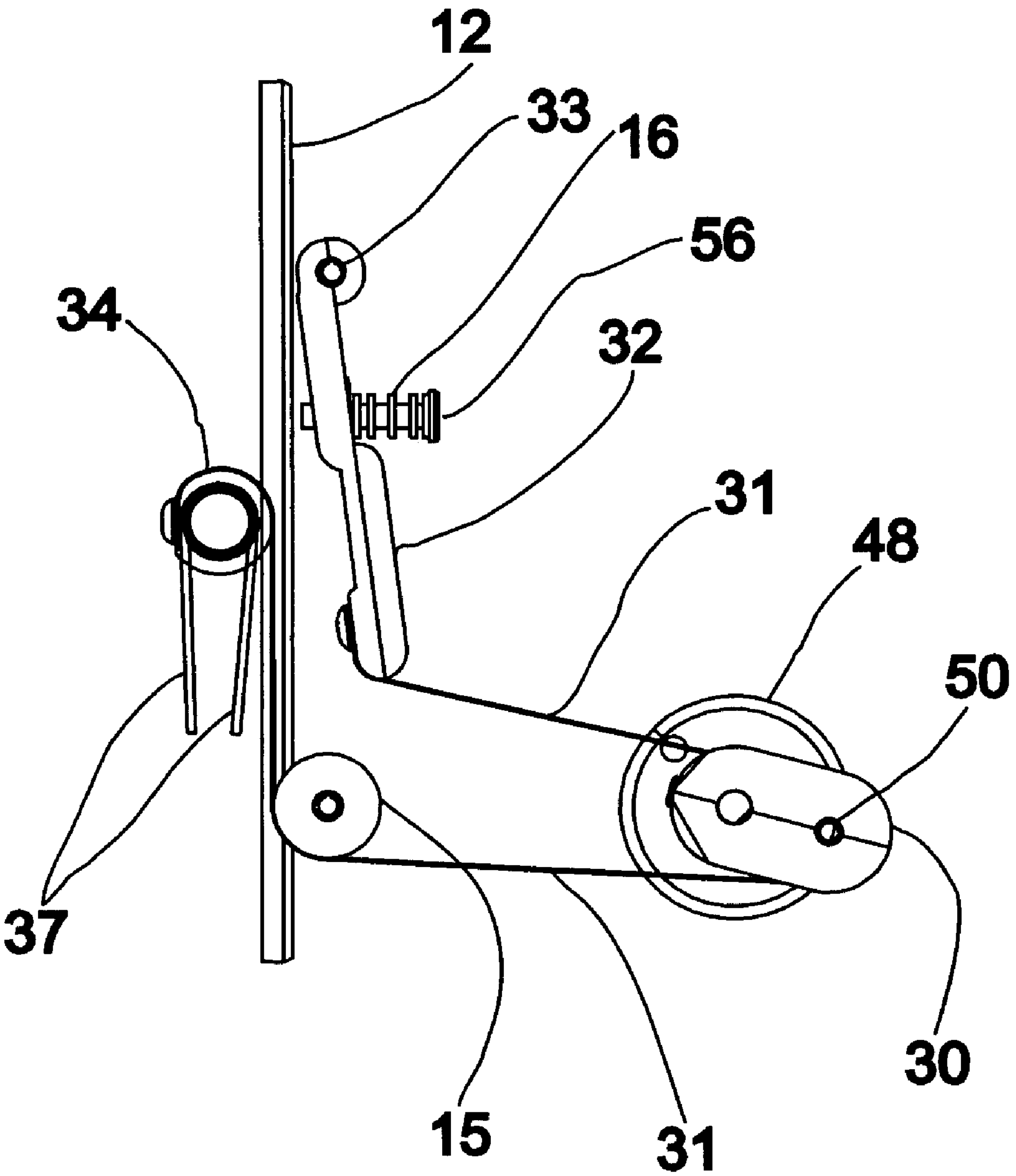
FIG. 7 is an enlarged view of the drive system of the emergency luminaire shown in FIG. 2 with the panel in its fully open position.

Referring now to FIG. 7, as the motor 48 rotates, eventually crank arm 30 will have rotated counterclockwise approximately 170 degrees from the closed position, thereby providing additional tension to drive band 31, causing it to unwind panel drum 34 a further amount, resulting in panel 12 rotating clockwise a further amount and opening 180 degrees from the closed position, coming to rest against a mechanical stop 52. Panel 12 is now in its fully open position. Any additional rotation by motor 48 (up to 180 degrees) will cause crank arm 30 to provide maximum tension to drive band 31, which is taken up by compression spring 16.

When the drive system is as shown in FIG. 7, the emergency luminaire 10 appears in the state illustrated in FIG. 3. When viewed from the "room" side of wall 40, the panel 12 of the emergency luminaire 10 is in the "fully" open position wherein lamps 25 and 26 are exposed to provide fully adjustable illumination. Crank arm 30 is shown in its extended position, providing maximum tension to drive band 31.

Referring once again to FIG. 2, limit switch 17 has an actuator that faces away from the room and its purpose is to break the connection between the battery 19 and the motor 48. When panel 12 approaches the fully open position, the side of the panel on which the lamps 25 and 26 are attached engages the actuator of limit switch 17, thereby keeping the drive system in the position shown in FIG. 7 (i.e., the panel is fully open) until AC power is reinstated. The limit switch 17 can be positioned so that the panel activates the switch 17 in time to prevent any motor drift from causing the crank arm from overshooting the 170 degree rotation point. In other words, the limit switch 17 turns off the battery power to the motor before the panel 12 reaches its fully open position, thereby allowing the motor 48 to drift slightly until the panel reaches its full 180 degree open position.

Mechanical stop 52 provides a physical limit to prevent the panel 12 from rotating past its fully open position. Mechanical stop 52 is preferably formed from the housing that encloses limit switch 17.

As the drum 34 rotates, pressure is applied to the torsion spring 37 mounted to the drum 34. The compressed torsion spring 37 stores energy which is needed when the panel rotates to its closed position. The rotation of panel 12 is restricted to 180 degrees by mechanical stop 52. Any further motion of the motor 48 and crank arm 30 is taken up by the band adjustment arm 32 and compression spring 16, thereby ensuring that the panel 12 comes to rest in a totally or fully open position. When the panel reaches its fully open position, the battery, which was maintained in a state of full charge during the period when AC power is available, is connected to the light sources 25, 26, causing them to illuminate. The light sources 25, 26 remain on until either the battery is drained completely or the AC power is reinstated.

When the power to the primary lighting source is restored the emergency light sources 25, 26 are extinguished and the single-directional drive motor 48 is activated so that the crank arm 30 rotates; the drive band 31 will slide over the crank arm 30 and specifically the crank arm roller 50, gradually relieving the tension on the drive band 31. The band adjustment arm 32 will take up the slack in the drive band 31. Roller 15 provides a smooth nearly frictionless surface for the drive band 31 to slide against.

As disclosed previously, torsion spring 37 is connected to drum 34. When the crank arm 30 releases pressure on the drive band 31, torsion spring 37 provides the force to rotate the panel in the counterclockwise direction in order to close panel 12. Torsion spring 37 also rotates drum 34, thereby rewinding drive band 31 to about drum 34. Torsion spring 37 was placed under tension when the panel 12 was opening (storing energy), and is designed to smoothly return the panel 12 to its closed "rest" position. Thus, the torsion spring 37 provides the force to close panel 12; drive band 31 by acting on drum 34 during its rewinding phase provides a braking force on the torsion spring 37 which prevents the panel from snapping shut.

It is important to note that even though motor 48 and crank arm 30 always rotate in one direction (i.e., counterclockwise), the panel 12 rotates clockwise when moving towards its open position and rotates counterclockwise when moving towards its closed position.

Shortly before the panel 12 reaches its fully closed position it engages the actuator of limit switch 18. When limit switch 18 is actuated, it disconnects the motor 48 from the battery 19. In this manner, motor drift will force the panel 12 to close completely. The limit switches 17, 18 can be seen in FIG. 2. Further, mechanical stop 51 prevents the panel 12 from rotating past its closed position so that the front side of panel 12 appears substantially flush with the wall 40 as shown in FIG. 1.

In a preferred embodiment, a motor control circuit may be employed to more accurately control and anticipate the motor drift. The motor control circuit may utilize a microprocessor. The motor control circuit would be electronically connected to both limit switches 17, and 18, motor 48 and battery 19. Also, the motor control circuit can monitor the current drawn by the motor 48 to ensure that the motor does not overheat (e.g., when a maintenance worker inadvertently paints shut the panel 12).

A feature of the present invention is that the motor 48 does not require a reverse direction circuit. Another feature is that if either limit switch 17 or 18 fails, the motor 48 will just continue to rotate and the panel will either move from its open position to its closed position or vice versa.

Rotation of the drive motor 48, and therefore crank arm 30, beyond 180 degrees results in panel 12 returning to the closed position; providing jam-free operation.

The length of the drive band, the offset of the crank arm, the tension on the band adjustment arm and the diameter of the drum are dimensioned so that the panel can rotate on its axis more than 180 degrees. However, the panel motion is restricted to 180 degrees by the mechanical stops. Any further motion of the motor and crank arm is taken up by the band adjustment arm and compression spring, thereby ensuring that the panel comes to rest in either a totally closed or totally open position with spring loading ensuring solid contact with mechanical stop 52 when the panel is closed and the tension on drive band 31 ensuring solid contact with mechanical stop 51 when the panel is in its open position.

It would be apparent to one skilled in the art, after a reading of the present disclosure, to modify the subject emergency luminaire to use as a standard room light. Modern decor tends towards a minimalist design; the present invention would be ideal, if modified, for use as a standard light fixture in a home with a modern decor anywhere a surface mounted light fixture would be intrusive. The drive system disclosed in FIGS. 4 through 7 would be retained, including the motor, but the AC failure detection circuit, battery and battery charger could be eliminated. The motor would derive its current from the AC power. A wire would be run from the drive motor and the lamps to a standard wall switch. A person can flip the switch when they enter a room thereby activating the recessed light fixture. When activated, the motor will drive the panel from its closed position to its open position and the lights would be turned on. When it is desired to turn off the lights, the switch can be flipped off; the lights will turn off and the panel will then rotate from its open position to its closed position, thereby concealing the lights.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the claims.

We claim:

1. A retractable recessed emergency luminaire, which is actuated when power to the primary lighting source in a room is interrupted, comprising:

a) a frame positioned flush with a wall or ceiling aperture and presenting an opening;

b) an enclosure mounted to said frame and positioned inside the wall or ceiling for providing a protected housing;

c) a panel having a center axis, said panel attached to said frame so that said panel may rotate about its center axis between a closed position and an open position;

d) a light source mounted to one side of said panel such that when said panel is in the closed position the light source is completely enclosed within the enclosure and when said panel is in the open position the light source is exposed to illuminate at least a portion of said room;

e) a motive means for rotating said panel from the closed position to the open position when power to the primary lighting source in said room is interrupted and for rotating said panel from the open position to the closed position when power to the primary lighting source in a room is restored, the motive means being continuously mechanically connected to the panel, and comprising:

i) a single directional electric motor having a rotating shaft extending therefrom;

ii) a crank arm mounted to said shaft;

iii) a drum mounted to the center axis of said panel;

iv) a torsion spring mounted to said drum;

v) a band adjustment arm secured to the frame;

vi) a drive band having a first end and a second end, said first end connected to said band adjustment arm and said second end connected to said drum so that when the shaft of said single directional motor rotates it causes said crank arm to rotate which alters tension on said drive band thereby allowing said drum to rotate which causes said panel to rotate; and vii) mechanical stops which limit the rotation of said panel; and f) a control circuit electrically connected to said motive means and to said light source, said control circuit including: i) means for sensing when power to the primary light source has been interrupted and restored, ii) means for activating said motive means until said panel is in its open position and contemporaneously activating said light source when said power has been interrupted, and iii) means for activating said motive means until said panel is in its closed position and turning off said light source when power to the primary light source has been restored.

2. The apparatus of claim 1, which further comprises a power source to operate the light source and means for rotating the panel from the closed position to the open position when the power to the primary light source is interrupted.

3. The apparatus of claim 2 where the power source is at least one re-chargeable battery.

4. The apparatus of claim 3 wherein the light source comprises a plurality of swivel-mounted lights.

5. The apparatus of claim 3 wherein said retractable recessed emergency luminaire receives power from the primary lighting power source when said primary lighting power source is detected.

6. The apparatus of claim 5 wherein the control circuit further comprises a battery charger for re-charging said battery when primary lighting power source is detected.

7. The apparatus of claim 1 wherein the light source is a swivel-mounted light to provide maximum adjustment capabilities for illumination of the room.

8. The apparatus of claim 1 where the control circuit further comprises a first limit switch for detecting whether the panel is open and to signal the single directional motor to stop when the panel approaches the open position, and a second limit switch for detecting whether the panel is closed and to signal the single directional motor to stop when the panel approaches the closed position.

9. The apparatus of claim 1 wherein the crank arm has an oval shape.

10. The apparatus of claim 1 wherein said band adjustment arm incorporates a manual adjustment that permits adjustment to the tension of the drive band to ensure the drive band always remains taut.

11. A recessed emergency lighting fixture for mounting within a room, and having a panel that rotates between a closed position when primary power is detected and holding a lamp in a retracted position and an open position when primary power has been interrupted wherein the lamp is activated and positioned to illuminate at least a portion of the room, said recessed emergency lighting fixture comprising:

a motor that rotates in only one direction; and a drive system that continuously mechanically connects the motor and the panel for rotating said panel between its open and closed positions.

12. The apparatus of claim 11 wherein the drive system further comprises:

i) a crank arm mounted to a rotating shaft on said motor;

ii) a drum mounted on said panel;

iii) a torsion spring mounted to said drum;

iv) a band adjustment arm secured to the light fixture;

v) a drive band having a first end and a second end, said first end connected to said band adjustment arm and said second end connected to said drum so that when the shaft of said single directional motor rotates it causes said crank arm to rotate which alters tension on said drive band thereby allowing said drum to rotate which causes said panel to rotate.

13. The apparatus of claim 12 wherein the open position of the panel is 180 degrees from the closed position.

14. A retractable recessed emergency luminaire, which is actuated when power to the primary lighting source in a room is interrupted, comprising:

a) a frame positioned flush with a wall or ceiling aperture and presenting an opening;

b) an enclosure mounted to said frame and positioned inside the wall or ceiling for providing a protected housing;

c) a panel having a center axis, said panel attached to said frame so that said panel may rotate about its center axis between a closed position and an open position wherein the open position of the panel is 180 degrees from the closed position;

d) a light source mounted to one side of said panel such that when said panel is in the closed position the light source is completely enclosed within the enclosure and when said panel is in the open position the light source is exposed to illuminate at least a portion of said room;

e) a motive means for rotating said panel from the closed position to the open position when power to the primary lighting source in said room is interrupted and for rotating said panel from the open position to the closed position when power to the primary lighting source in a room is restored, the motive means being continuously mechanically connected to the panel, and comprising:

i) a single directional electric motor having a rotating shaft extending therefrom;

ii) a crank arm mounted to said shaft;

iii) a drum mounted to the center axis of said panel;

iv) a torsion spring mounted to said drum;

v) a band adjustment arm secured to the frame;

vi) a drive band having a first end and a second end, said first end connected to said band adjustment arm and said second end connected to said drum so that when the shaft of said single directional motor rotates it causes said crank arm to rotate which alters tension on said drive band thereby allowing said drum to rotate which causes said panel to rotate; and vii) mechanical stops which limit the rotation of said panel; and f) a control circuit electrically connected to said motive means and to said light source, said control circuit including: i) means for sensing when power to the primary light source has been interrupted and restored, ii) means for activating said motive means until said panel is in its open position and contemporaneously activating said light source when said power has been interrupted, and iii) means for activating said motive means until said panel is in its closed position and turning off said light source when power to the primary light source has been restored.

* * * * *